J. B. ALEXANDER.
Lamp.
No. 101,961.
4 Sheets—Sheet 1.
Patented April 12, 1870.
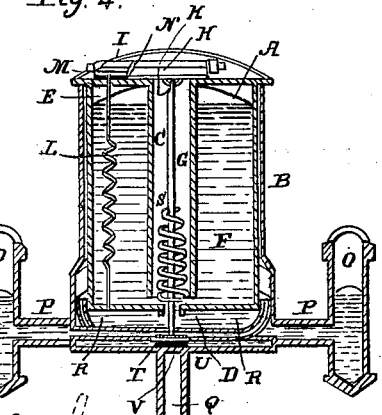
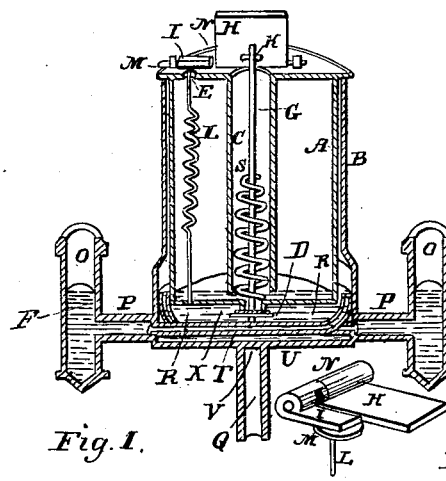
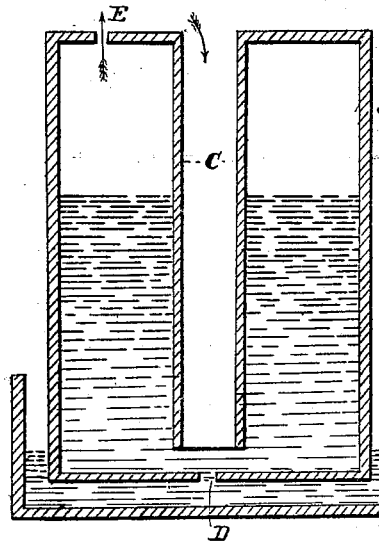
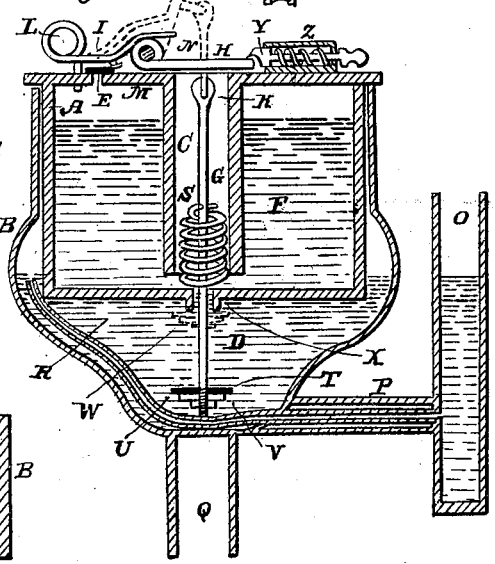
Witnesses:
Rowland Cox
Harry Cox
Inventor:
J. B. Alexander J. B. ALEXANDER.
Lamp.
No. 101,961.
4 Sheets—Sheet 2.
Patented April 12, 1870.
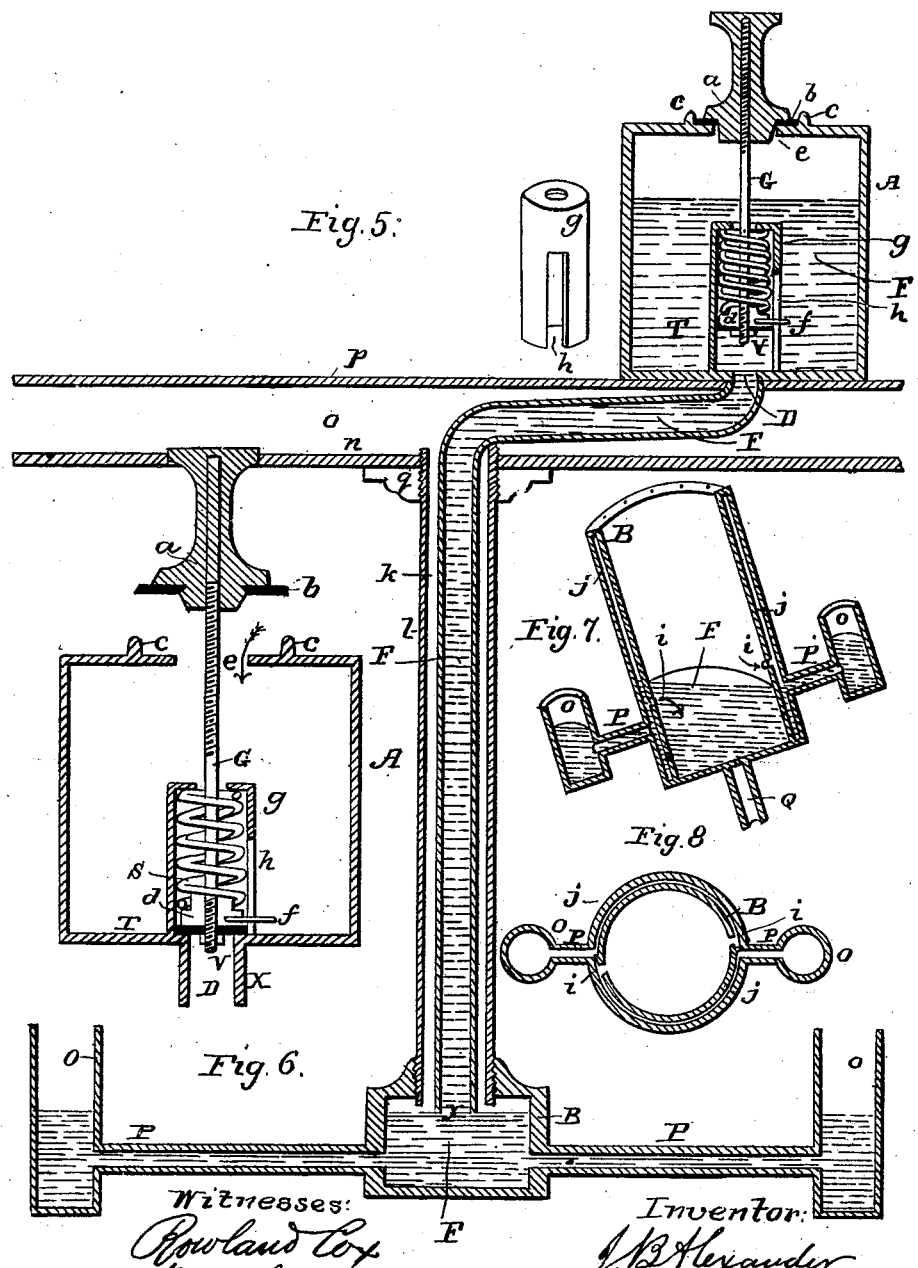

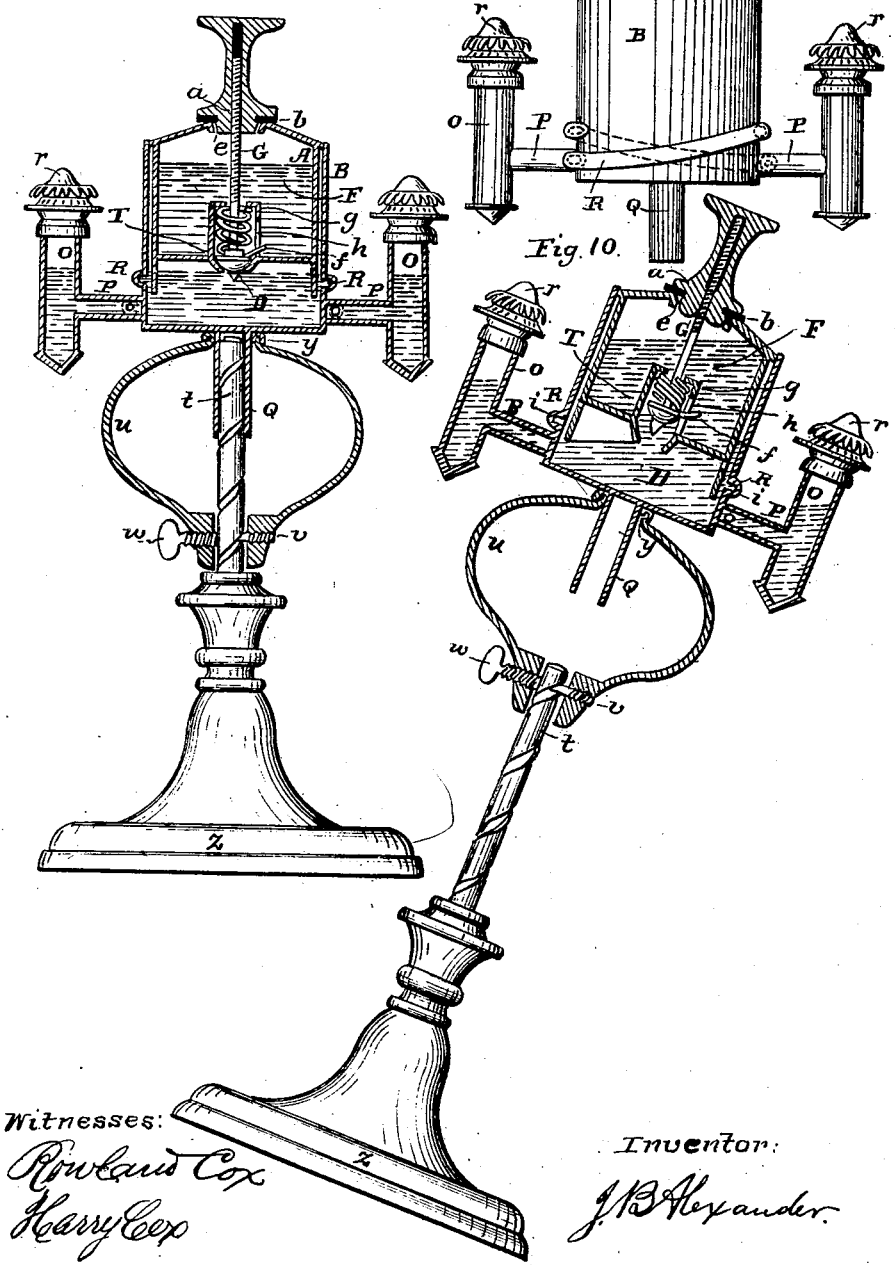

J. B. ALEXANDER.
Lamp.
No. 101,961.
4 Sheets—Sheet 4.
Patented April 12, 1870.
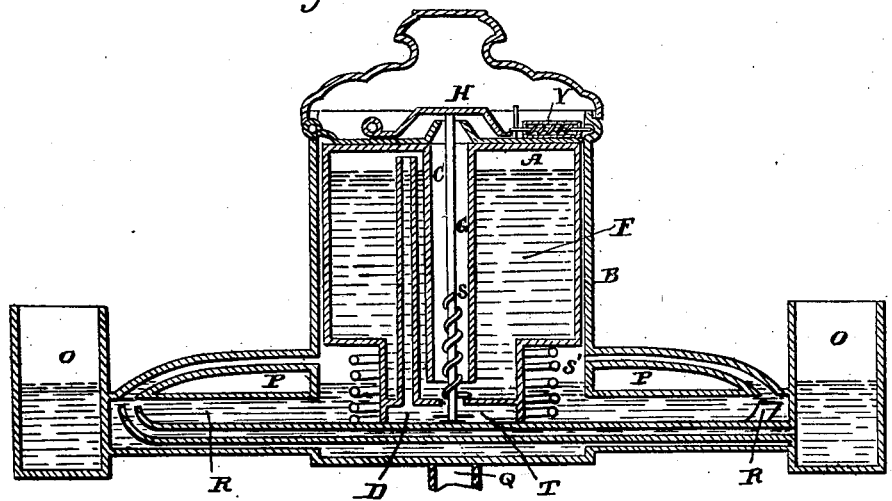
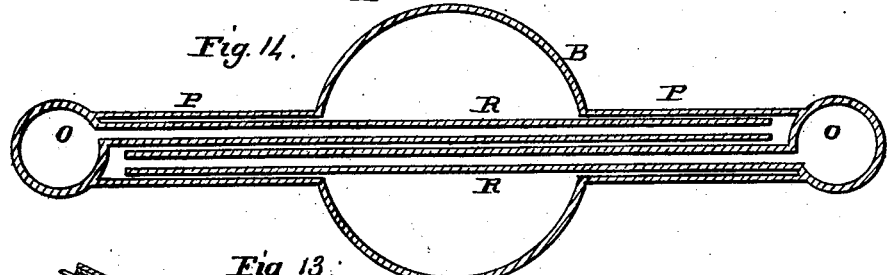
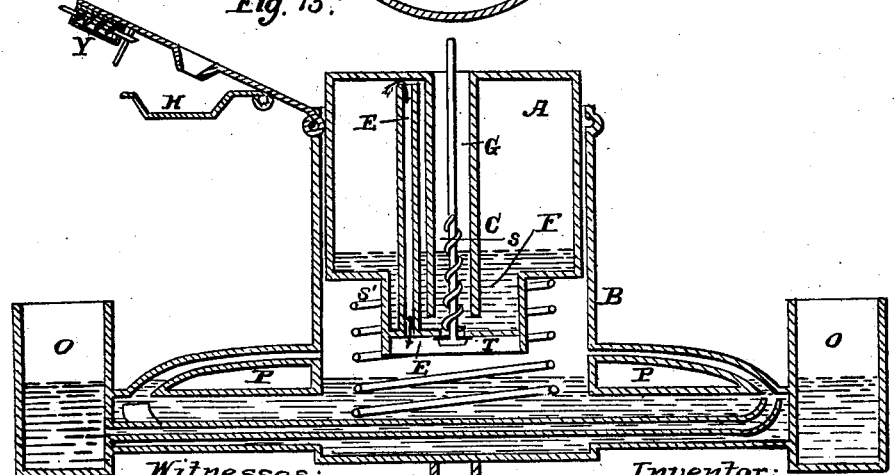

United States Patent Office.

JOSEPH BELL ALEXANDER, OF WASHINGTON, DISTRICT OF COLUMBIA.

Letters Patent No. 101,961, dated April 12, 1870.

IMPROVEMENT IN LAMPS.

The Schedule referred to in these Letters Patent and making part of the same.

*To all whom it may concern:*

Be it known that I, JOSEPH BELL ALEXANDER, of Washington, in the county of Washington and District of Columbia, have invented a new and useful improvement in Lamps; and I do hereby declare the following, when taken in connection with the accompanying drawings and the letters of reference marked thereon, to be a full, clear, and exact description of the same, and which said drawings constitute part of this specification, and represent in—

Figure 1 a diagram of the lamp-fount in vertical section, showing the top and bottom openings without valves.

Figure 2 is a vertical section of the lamp-fount with its proper valves and machinery occupying its place within the bowl of a lamp or chandelier.

Figure 3, a vertical section of a lamp or chandelier with the fount empty, and showing the lower or feed-opening closed, and the air-hole at the top and mouth of the receiving-tube open to receive a replenishment of liquid.

Figure 4, a vertical section of a lamp or chandelier with the fount full, and showing the air-hole at the top closed air-tight by a valve, the mouth of the receiving-tube closed loosely, and the lower orifice open, through which the liquid passes automatically to feed the flame, as required.

Figure 5, a vertical section of another form of automatic fount, embracing the principle of being replenished through an opening at the top.

Figure 6, a vertical section of the fount shown in fig. 5, feeding liquid from an elevated position through a pipe to a chandelier.

Figure 7, a vertical section of the bowl of a lamp or chandelier formed with an inner and outer cylinder.

Figure 8, a plan view, showing a horizontal section of the lamp-bowl shown in fig. 7.

Figure 9, a vertical section of the lamp on a stand, showing the liquid in the bowl standing about the level of the mouths of the exit-tubes, and a screw for raising and lowering the body of the lamp.

Figure 10, a vertical section of the same, showing the body of the lamp elevated by the screw, and tipped over so as to show the level-lines assumed by the liquid in each of the four different chambers represented.

Figure 11, a side elevation of the lamp, in perspective, showing spiral tubes surrounding the outside of the bowl from which they receive the liquid on one side and discharge it into a tube conveying it to a lamp-burner on the opposite side.

Figure 12, a vertical section of a modification of the reservoir-fount, shown in figs. 1, 2, 3, and 4, in which the valve M is dispensed with, the air-hole E being placed at the end of a tube opening at the bottom of the vessel A, which is represented as filled with oil.

Figure 13 the same as fig. 12, and showing the fount A nearly empty, and elevated by the spiral spring S', for the purpose of being replenished; and Figure 14, a horizontal section of the bowl B, pipes P P, tubes R R, and burner-cups O O, as arranged in figs 12 and 13.

Similar letters of reference denote like parts wherever they occur in the several figures, as follows:

A, the lamp-fount.

B, the bowl of the lamp, receiving the fount.

C, a tube extending downward through the center of the fount to about a quarter of an inch from the bottom of the vessel.

D, an exit or discharge-orifice in the center of the bottom of the fount, and in a line with the axis of the tube C.

E, a small orifice or air-hole at any convenient part of the top of the vessel A.

F, ruled lines representing oil or liquid wherever they occur or extend in any of the figures.

G, a rod or stem arranged to move up and down in the center of the fount A.

H, a loose cover for the mouth of the tube C, hinged to the top of the fount A, and connected with the stem G by an elbow-joint at K.

I, a hinged cap over the air-hole E.

L, a spring for holding down the valve I upon the air-hole E.

M, a piece of leather attached to the under part of the hinged cap I, forming a flute-key valve upon the air-hole E.

N, a cam arranged on any part of the hinged cover H, so that when H is nearly up to its highest point, it will suddenly act on some connection with the valve I, so as to raise it also, barely sufficient to give a free passage for air.

O O, cups into which the lamp-burners are screwed, and which are connected with the bowl B by the tubes P P.

Q, a hollow or solid pin descending from the bottom of the bowl B, so as to loosely enter a socket upon a stand, thus forming a swivel for the horizontal rotation of the body of the lamp.

R R, small tubes connected with and discharging into the tubes P P, and arranged either inside or outside of the bowl B, so as to receive the liquid or oil from the opposite side of the bowl B to that to which it is conducted for consumption.

S, a spiral spring acting on the rod or stem G.

T, a leather disk attached to the lower end of the stem G by means of the metal cap U and screw-nut V, forming a valve for closing the orifice D.

W, dotted lines showing the position of the valve T, the hinged cover H, and the valve I, when the stem G is allowed to spring upward.

Y, a spring-bolt working in the tube Z for the purpose of holding down the hinged cover H.

a, a cap acting as a screw-nut on a screw cut upon the upper part of the stem G, as seen in a second modification of fount, shown in plates 2 and 3, (see figs. 5 and 6.)

b, a leather disk or washer.

c, a cup, which may be raised on the top of fount A to receive disk b and oil.

d, a nut of plunger on lower end of stem G.

e, upper opening of the fount A.

f, a pin attached to nut d.

g, a tube to hold the spring S, and guide the movement of the valve d, T, V.

h, a slot in the tube g to accommodate the pin f, which prevents the rod G turning.

i i, exit-holes for oil or liquid from a double cylinder bowl to the pipes P P, the liquid passing through the narrow spaces between the outer and the inner cylinders marked j j, and thus feeding each pipe and burner from the opposite side of the bowl, the effect being the same as with the tubes R R.

k, a pipe leading oil or liquid from an elevated fount of the second plan.

l, the pipe of a chandelier.

m, the point at which the reception and distributing-bowl of the chandelier is screwed to pipe l.

n, o, p, represent the support of the fount and chandelier, as, for example, the ceiling, interspace, and upper floor of a building.

q, the connection of the chandelier with the ceiling.

r r, lamp-burners attached to cups O O.

t, a quick screw attached to the pedestal z, upon which the body of the lamp supported by the case u is made to rise by means of nut v.

w, a set-screw to sustain the body of the lamp at any desired elevation.

x, the lower end of the liquid or oil-pipe of chandelier.

y, the collar of a lamp-stand, which receives the peg or pin Q.

The nature of my invention relates to such lamps as sustain the oil in their founts by atmospheric pressure, and feed it automatically upon the principle of the bird-fountain, as in the German student's lamp, with a fount which may be filled by an open mouth at the top, as in any ordinary hand-lamp, and which shall be made to feed the liquid automatically, or be checked at will, and consists in constructing such lamps under a peculiar arrangement and combination of parts, and providing them with a peculiar mechanism, as hereinafter described; also in providing such lamps as feed their oil through pipes at a distance from the center or reservoir with an arrangement which will prevent the overflow at the ends of the pipes when tilted over, so that they can be carried about more safe and free from overflow than an ordinary hand-lamp; also in providing such lamps with an easy horizontal rotation, and a quick and easy mode of elevation.

In order to enable others skilled in the art to which my invention appertains to make and use the same, I will now proceed to describe its construction and operation, referring to the annexed drawings, as required in the description.

As atmospheric-pressure founts, to be filled by pouring the liquid into an opening at the top, must be varied somewhat in the construction when applied to hand-lamps from those lamps which are fixed, and receive their oil from an elevation, I will describe first that form of fount best adapted to use in hand-lamps.

For this fount a close vessel may be made of cylindrical shape, (see A, fig. 1,) having a tube C descending from its top through the center to about a quarter of an inch of the bottom.

In this bottom a hole, D, must be cut directly in the axis of the tube C. In the top a small hole, E, must be made.

Now it is obvious that if a finger be placed upon the hole D and liquid poured into the tube C, the liquid will descend and rise under the lower end of the tube C, expelling the air before it through the hole E until the vessel A is full.

If this vessel be now placed in an open disk or bowl, B, (without reversing,) and the finger be withdrawn from the hole D after applying first a finger upon the hole E, it will be seen that the tube C will become emptied of the small quantity of liquid it contained, through the hole D, and also enough liquid will pass from the vessel A to raise the liquid in the basin B to a level with the lower end of the tube C, the vessel A retaining itself full by atmospheric pressure.

If any liquid be drawn away from the basin B, the sinking level will leave the lower end of the tube C, and a bubble of air will rush under it up into the body of the vessel A, and thus expel enough liquid to restore the equilibrium in the basin B.

The principle involved is thus completely described, and to render it effectual as an automatic feeder to the flame of a lamp situated lower than the head of oil in the fount, and completely manageable without removal from the lamps, it is only necessary to arrange within and upon the vessel A such suitable machinery as will simultaneously close the lower orifice D and open the upper orifice E and mouth of tube C, and *vice versa*; or, what is better, to so arrange the machinery that the orifice D will be closed before the orifice E is opened, and, conversely, that the orifice E will be closed before D is opened again.

By referring to fig. 2, it will be seen that a rod or stem, G, linked at K to a hinged cover, H, may be made to move up and down in the center of the tube C.

The lower end of the rod G passes through the orifice D loosely, and is terminated by a leather disk, T, washer U, and nut V, forming a valve for closing the orifice D, which it is better to slightly elongate by a short piece of tube, X.

The air-hole E may be opened or closed by means of a valve composed of a leather disk, M, and metal cap I attached to and pressed down by the prong of a helical spring, L, which extends forward in such a manner as to be operated upon and slightly lifted by a cam, N, on the hinged lid H, thus lifting the valve M and slightly opening the air-hole E.

The rod G is forced upward by a spiral spring, S, attached to it and operating within the tube C.

The rod G, valve T, and hinged cover H are held down by a spring-bolt, Y, working in the tube Z, thus loosely closing the mouth of the tube C, tightly closing the air-hole E, and opening the lower orifice D.

If the spring-bolt Y be drawn, the rod G will be forced up by the spring S and push up the cover H, which, operating by the cam N the valve M, the mouth of the tube C, and the air-hole E are opened while the lower orifice D is closed, and the parts assume the position indicated in the dotted lines W.

In this position the fount may be filled with liquid by simply pouring it into the mouth of the tube C, and, as no possible discharge can take place through the orifice D while in this condition, it will be seen that the automatic action of the fount is directly under the control of the will.

If the cover H be forced down suddenly by the finger, it will catch under the spring-bolt Y, allow the air-hole E to be closed, and open the orifice D, when the liquid will supply automatically any waste or consumption from the level in the bowl B.

The valve M covering the air-hole E may be made to hinge directly on the fulcrum of the cover H, and may be held down by the spiral spring L attached by the upper end to its center, and by the lower end to the bottom of the vessel A, as seen in figs. 3 and 4.

The cover H has a small part of the upper portion of its axis cut away at N, (see auxiliary drawing attached to fig. 3,) to which is adapted an extended portion of the axis of hinge-valve I, which is so cut that the cover H in rising will only affect the valve I in the latter part of its upward stroke.

The air-hole E may be placed at the bottom of the reservoir A by being made the termination of an air-tube, extending from near the top of the reservoir downward to the bottom of the same, as shown in figs. 12 and 13.

The lower end of this air-tube dipping below the surface of the oil in the bowl B is sealed by the column of oil which rises in it, and performs the same function as the valve M, which is dispensed with in this modification, as seen in fig. 12.

In this arrangement, when the reservoir is to be replenished with oil, it must be elevated by being lifted up, or by means of a spiral spring, S, until the air-hole E at the bottom rises above the surface of the oil in the bowl B, as seen in fig. 13.

After filling the reservoir it is pushed down to its proper place in the bowl B, and held there by means of buttons, spring catches, or any other suitable device, as in fig. 12.

The elbow-joint K, shown in figs. 2, 3, and 4, may also be dispensed with, and the upper end of the rod G allowed to play loosely against the under part of the hinged cover H, as in figs. 12 and 13.

I will now proceed to describe another form of fount, as already mentioned, and adapted to feeding liquids through a pipe or pipes from an elevated position to fixed lamps or chandeliers.

By referring to fig. 5 it will be seen that the fount A may be made without the central tube C, which is dispensed with in this form of fount for important reasons. Also, the air-hole E is dispensed with.

The vessel A is made cylindrical, as the best form, and entirely closed, except the lower orifice D and an orifice, e, directly in the center of the top, and of sufficient diameter to admit the free pouring of liquids through it into the vessel.

A piece of tubing, g, (see auxiliary drawing to fig. 6,) having a slot, h, cut into its side, is firmly attached by one end to the bottom of the fount A, and directly surrounding the orifice D.

This piece of tube serves as a guide for the plunger d, which is screwed onto the lower end of the rod G, to which is also attached a leather disk, T, by the nut V.

A spiral spring, S, is placed in the tube g, around the rod G, and confined by a cap having a hole in the center, through which the rod G plays.

The upper portion of the rod G has a screw-thread cut upon it, to correspond with a female thread cut in a long tubular nut, a, to which is attached a leather disk, b.

When the cap-valve a is raised so that the fount can be filled by pouring liquids through the mouth e, the lower valve T will effectually close the lower orifice D.

When the fount A has been filled, if the cap-valve a be screwed down, it will descend upon the rod G until the leather disk b will become air-tight upon the upper orifice e.

If the nut a be turned a number of times more in the same direction, the plunger d and valve T will rise up and open the lower orifice D.

The rod G is kept from turning by the pin f, inserted in the plunger d, and working in the slot h.

This form of fount may be used in hand-lamps, as shown in figs. 9 and 10, but is better adapted to stationary and elevated positions, where a fount containing from one to many gallons is required, and, where liquids are required to descend automatically from elevated positions, it is the only form that can be used for that purpose.

By referring to fig. 6, a fount of the form shown in fig. 5 may be seen occupying an elevated position on the floor p.

A pipe, k, connected with the lower orifice D, passes through the space o between the floor p and the ceiling n, and descends through the pipe l of a chandelier, suspended to the ceiling at q.

The chandelier is provided with a bowl, B, attached to the case-pipe l, at m.

The tube k, which descends air-tight from the fount A, ends with an open mouth, presented downward at x, a little way into the bowl B, from which may extend pipe-arms P P to burner-cups O O.

To operate this fount in connection with the chandelier, as shown in fig. 6, it is necessary to turn back the long nut a until the valve T closes the lower orifice D, and the valve b rises sufficiently to admit liquids to be poured into the mouth e.

When the fount is full, turn down the nut a until the valve b closes air-tight the upper orifice e, and continue to turn the nut until the valve T is sufficiently raised to admit the air to ascend through the pipe k, orifice D, and slot f.

The liquid will then descend through the pipe k into the bowl B, tubes P P, and burner-cups O O, until it will rise to the point x, sealing the mouth of the pipe k, which will soon become full in its turn, giving its air to the interior of the fount A, until a complete equilibrium is established.

This fount can be refilled at any time without moving the fount or disturbing a drop of the liquid in the pipe k, or the equilibrium in the bowl B.

I will observe here that the action of the rod G, as represented in plate 1, is entirely different from its action, as represented in plates 2 and 3; also that the fount, shown in figs. 1, 2, 3, and 4, receives all its air from the top, descending through the tube C, and the fount shown in figs. 5, 6, 9, and 10, receives all its air through the lower orifice D.

It can be seen at a glance that the fount shown in figs. 1, 2, 3, and 4, is best adapted to hand-lamps, on account of the instantaneous action of the machinery in the opening and closing of its orifices.

To render this invention more useful when applied to the hand-lamp, by preventing an overflow of oil in the cups O O, when the lamp is tilted or leaned over, (see figs. 7 and 10,) I cause each burner to be supplied with oil from the opposite side of the fount from that from which its tube and support emanate.

By referring to fig. 2, it will be seen that the supply-tube R rises on the opposite side of the bowl from that of the burner-cup O, almost to the standard level of the oil in the bowl B, its mouth being but slightly submerged below the level line. If the lamp thus arranged be tilted over in the direction of the cup O, the change of position of the oil in the bowl B, leaves the receiving-mouth of the tube R above the oil, and receiving only air, and, as the upper mouth of the tube R is the only means of communication between the oil in the bowl B and that in the cup O, it is obvious that no more oil can escape into the cup O than the minute quantity contained in the small tube R.

This will be the result with any number of branches from a common center, if the same arrangement is observed.

Figs. 3 and 4 represent the tubes R R as passing each other inside of the bowl B, and raising their mouths to near the standard oil-level, oppositely to their respective burners.

The same effect is obtained by small tubes arranged on the outside of the bowl B, receiving oil on one side and discharging it into a burner cup on the other side, as seen in figs. 9, 10, and 11.

The same effect may be produced by making the bowl B of the lamps of an inner and outer cylinder, with a very narrow space between the two, as seen in figs. 7 and 8.

This narrow space $jj$ must be divided into two separate chambers by longitudinal partitions near the exit of the tubes P P, and no communication must exist between the center of the bowl B and the separate chambers $jj$, except by two small holes $ii$, leading one into each chamber, and the chambers each communicating with its respective burner-cup oppositely to its point of communication with the interior of the bowl B.

The holes $ii$, as necessary, must be made at an elevation a trifle under that of the standard level of the oil in the bowl B, when containing an automatic fount.

Numerous other devices might be illustrated embracing the same principle and obtaining the same result.

As another improvement upon the kind of lamp here described, I attach a piece of tube or a solid peg, Q, figs. 2, 3, 4, 7, 9, 10, and 11, centrally to the bottom of the bowl B, so that it shall project downward, and enter and turn like a swivel in the collar of any ordinary glass or other hand-lamp.

By this means the burners $rr$ can be made to revolve horizontally by a push of the finger, without having to move the stand on which it rests, as in figs. 9 and 10.

The lamp, as seen in fig. 11, can be instantly applied to any common hand-lamp which has a standard size collar upon it.

For the purpose of elevating this lamp or lowering it, (see figs. 9 and 10,) I make a pedestal, $z$, and a rod, $t$, rising up from it, upon which I cut a spiral groove.

I make a tube or a globular case, $u$, which will slide freely upon the rod $t$, and which will receive the peg Q of the lamp into its upper end.

Near the lower end of this case $u$ I insert a pin, $v$, the point of which is made to enter the spiral groove on the rod $t$, and thus form a nut which will elevate the lamp by simply twisting the case $u$ with the fingers.

A set-screw, $w$, is inserted into the case $u$ about opposite the pin $v$, the point of which being screwed against the rod will sustain the lamp at any elevation at which it is placed.

The automatic action of my improved fount is that of the well-known principle of the bird-fountain. The well-known and popular lamp, called the German student's lamp, has a fount, which to be refilled must be withdrawn from the bowl of the lamp, the valve held by the fingers while the fount is turned bottom up and the oil poured through a hole in the bottom.

The valve must be held by the fingers again to seal the hole until the fount can be reversed and returned to the bowl of the lamp. This cannot be done without soiling the hands, and making other discomforts.

The German student's lamp being an application of the bird-fountain in its simplest form, will overflow in a heated room, when the air in the fount becomes so rarefied as to expand and drive out a large portion of its liquid contents; consequently, drip-cups are a necessary accompaniment to it.

It will also overflow instantly if leaned over or inclined, as the oil will rise through the burner-cup by gravitation—all of which act as a check on its otherwise superior advantages over all other lamps.

The advantage of my improved lamp over the German student's lamp, and all other lamps of that class, is, that the fount can be refilled by pouring the oil in at the top of the lamp, as in the common hand-lamp; that no overflow can occur by inclining the lamp, for which reason it can be used with safety as a common hand-lamp; that any overflow which might occur by change of temperature in the surrounding air rarefying the air in the fount can be always prevented instantly by closing the lower orifice of the fount, by means of the mechanism attached; and that the flow of oil from the fount can be entirely stopped off when the lamp is not in use.

Having described the construction and operation of my improved lamp,

What I claim as new and as of my invention, and desire to secure by Letters Patent, is—

The tube C, as arranged in a removable or stationary fount of a lamp, A, in combination with the lower orifice D, the air-hole E, valve M, spring L, hinged cover H, cam N, elbow-joint K, rod G, spring S, valve T, and spring-bolt Y, and these in combination with the bowl B, tube R, pipe P, and burner-cup O of a lamp, substantially as described and for the purpose set forth.

Also, the tube C and air-vent E, as arranged in a removable or stationary fount of a lamp, A, in combination with the lower orifice D, rod G, hinged cover H, spring S, spring S', valve T, and spring-bolt Y, or its equivalent, and these in combination with the bowl B, tube R, pipe P, and burner-cup O of a lamp, substantially as described and for the purpose set forth.

Also, the combination of the fount, shown in fig. 5, with the tube $k$, pipe $l$, and a chandelier, as shown in fig. 6, substantially as described and for the purpose set forth.

Also, the prevention of the overflow of oil or liquid in the burner-cup O when the lamp is tilted or inclined, as in figs. 7 and 10, by so arranging the receiving-orifice of the duct leading to the burner-cup O that it will stand below, but near the surface of the liquid in the bowl B, when the lamp stands horizontally, and immediately rise above the surface of the liquid when the lamp is inclined, substantially as described.

Also, the tube R, in combination with the bowl B, pipe P, and burner-cup O, and these with any automatic reservoir-fount, substantially as described and for the purpose set forth.

Also, the narrow chambers $jj$ and holes $ii$, in combination with the bowl B, pipe P, and burner-cup O, and these with any automatic reservoir-fount, substantially as described and for the purpose set forth.

Also, the peg Q, in combination with the bowl B, pipe P, and burner-cup O, substantially as described and for the purpose set forth.

Also, any automatic reservoir-fount, in combination with the spirally-grooved rod $t$, nut $v$, set-screw $w$, pedestal $z$, and case $u$, substantially as described and for the purpose set forth.

In testimony that I claim the foregoing as my own I affix my signature in presence of two witnesses.

J. B. ALEXANDER.

Witnesses:
HARRY COX,
ROWLAND COX.